No. 745,338. PATENTED DEC. 1, 1903.
J. H. FERGUSON.
VEHICLE RUNNING GEAR.
APPLICATION FILED APR. 8, 1903.
NO MODEL.
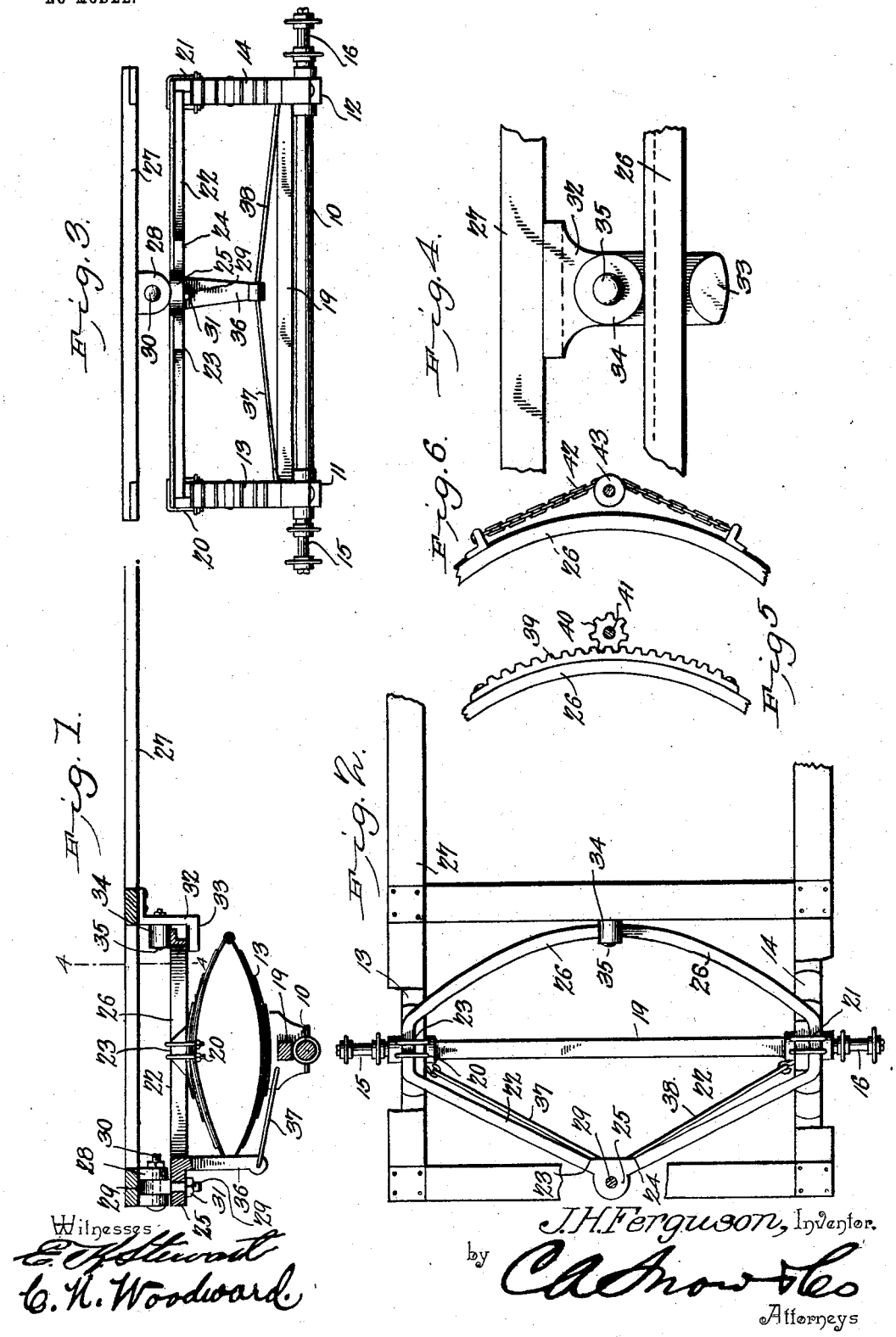
Witnesses
E. J. Stewart
C. N. Woodward
J. H. Ferguson, Inventor.
by C. A. Snow & Co.
Attorneys No. 745,338. Patented December 1, 1903.

UNITED STATES PATENT OFFICE.

JOHN H. FERGUSON, OF ZIMMERMAN, OHIO.

VEHICLE RUNNING-GEAR.

SPECIFICATION forming part of Letters Patent No. 745,338, dated December 1, 1903.

Application filed April 8, 1903. Serial No. 151,643. (No model.)

*To all whom it may concern:*

Be it known that I, JOHN H. FERGUSON, a citizen of the United States, residing at Zimmerman, in the county of Greene and State of Ohio, have invented a new and useful Vehicle Running-Gear, of which the following is a specification.

This invention relates to the running-gear of vehicles, more particularly to motor-vehicles of various kinds, and has for its object to simplify and improve devices of this character and to increase their efficiency and likewise increase their strength and durability and decrease the expense of manufacture; and the invention consists, primarily, in a vehicle having an axle and body portion, with the body portion and axle swivelly connected in advance of the axle.

The invention further consists in a vehicle having a body portion, a platform having the axle connected centrally thereto at opposite sides, and a swivel connection between the body portion and platform in advance of the axle.

The invention further consists in a vehicle having a body portion, a platform having an axle connected centrally thereto, a swivel connection between the platform and body portion in advance of the axle, and a guiding means between the platform and body portion in the rear of the axle.

The invention further consists in a vehicle having a body portion, a platform, an axle, springs connected between the axle and platform, and a swivel connection between the platform and body portion in advance of the axle.

The invention further consists in a vehicle having a body portion, a platform, an axle mounted for rotation upon the platform, springs connected between the platform and axle, a spreader member between the springs adjacent to the axle, and a swivel connection between the platform and body portion.

Other novel features of the invention will be disclosed in the annexed description and specifically pointed out in the claims.

In the drawings illustrative of one embodiment of the invention, in which corresponding parts are denoted by like designating characters, Figure 1 is a longitudinal sectional elevation of the forward running-gear and a portion of the body portion of a conventional vehicle with the improvements applied. Fig. 2 is a plan view, and Fig. 3 is a front elevation, of the same. Fig. 4 is an enlarged detail sectional view of the guiding means. Fig. 5 represents a modified form of the guide and rear platform adapted to serve as a steering device. Fig. 6 shows another modification of the steering device.

The improved device may be applied to any of the various makes of motor-vehicles and many forms of horse-vehicles, and I do not, therefore, wish to be limited in the use of the invention to any particular form of vehicle, but reserve the right to its use in connection with any form of vehicle to which it is applicable.

In the embodiment of the invention employed for illustration, 10 represents the forward axle, mounted for rotation by bearings 11 12 and connected by suitable clips upon the lower sides of springs 13 14.

The wheel-hubs are represented at 15 16, of the usual construction and mounted upon the journals at the ends of the axle. One of the boxes of the wheels will preferably be connected in any suitable manner rigidly to the axle, so as to partake of its rotary motion, by which means the "slow" wheel will be free to gain on the "fast" wheel in running on curves or around corners, and thus equalize the motion and prevent slipping and reducing the friction and correspondingly lightening the draft.

Between the bearings 11 12 adjacent to the axle 10 is a spreader-bar 19 of any approved form and operating to maintain the lower portions of the springs in their proper relative position and relieving the axle from end strains when heavy loads are carried, as hereinafter more fully explained.

Connected to the upper sides of the springs 13 14 by suitable clips 20 21 is a platform, preferably formed of a single bar 22 bent to shape and with its terminals united at 23 24 to a member 25, having a vertical aperture, this member 25 being located at a considerable distance in advance of the axle 10, while the other side, 26, of the platform is located at the same distance from the opposite side of the axle and curved in the arc of a circle of which the aperture in the member 25 is the center, as shown, the object to be hereinafter explained.

The body portion of the vehicle is indicated at 27, of any approved form, and is provided with a hanger 28, formed with spaced sides disposed transversely of the body portion and between which a stud 29 is pivoted at 30, the stud being thus free to oscillate transversely of the body portions and formed to engage the aperture in the member 25 and sesured in place by a nut 31 on the lower extremity of the stud.

Depending from the body portion 27 in the rear of the platform 22 is a hanger 32, having a lug 33 extending beneath the curved portion 26 and convex on its upper surface, as shown, the lug thus serving as a guide and support for the platform, over whose convex side it will freely roll as the platform oscillates with the movements of the axle and its attachments.

Above the portion 26 of the platform a bearing-roller 34 is disposed upon a stud 35, extending from the hanger 32, and between this roller and the lug 33 the platform moves as the running-gear swings upon its center stud 29, as will be obvious. By this arrangement it will be noted the center or swivel point is at a relatively long distance in advance of the axle, and this arrangement or position of the swivel connection is one of the important features of the invention and materially improves the action and causes the vehicle to maintain its course with greater uniformity, as the center of the axle will naturally follow or "trail" after the swivel-point and will not be so readily affected by unevenness of ground or lateral movements. Consequently the vehicle-body will not sway or vibrate so readily under transverse strains.

The bar 22, forming the platform, will preferably be L-shaped in cross-section, but may be of any other suitable shape, and the curved portion 26 will preferably be the same distance from the axle as the stud 29, as shown, so that the "load" will be borne equally at each side of the axle. By this simple arrangement as the platform and axle swing upon the stud the rear portion is supported and all sagging or unequal movement prevented and the friction and strains materially lessened. By this simple means also a very free-acting and easily-operated running-gear is produced which will run very steadily over uneven ground and will likewise move upon curves and around corners without lateral strains or the slipping of the slow wheels upon the inner sides of the curves by reason of the novel arrangement of the rotative axle with one wheel fast thereto, as above noted.

The socket member 25 is provided with a depending arm 36, from whose lower end brace-rods 37 38 lead to the bearings 11 12, to which they are connected, as shown, to provide additional supports between the parts. The whole device is thus very firmly braced and supported and the strains efficiently resisted from all sides and from all directions, so that no variations between the parts will take place under the very severe strains to which vehicles of this class are subjected.

The rear curved portion 26 may be utilized in steering the device by attaching thereto a gear-segment 39, with which a pinion 40 upon a vertical shaft 41, mounted for rotation in the body portion 27, engages, the shaft having an operating-wheel of the usual form convenient to the hand of the operator, as shown in Fig. 5.

If preferred, a chain 42 and drum 43 may be substituted for the segment and pinion, as shown in Fig. 6, or any other suitable mechanism may be employed for this purpose.

The spreader member 19 may be of any desired form and arranged at any point relative to the axle and may be in the form of a tube and inclosing the axle; but this would not be a departure from the principle of the invention, as the results produced would be the same.

The whole device is extremely simple, can be inexpensively manufactured, and will be found very efficient for the purposes described.

In the accompanying drawings is shown the preferable embodiment of the invention; but I do not limit myself to the precise construction therein shown, as it is obvious that various changes and modifications may be made without departing from the principle of the invention or sacrificing any of its advantges.

Having thus described the invention, what I claim is—

1. The combination in a vehicle, of a body portion, an elliptical platform having the axle connected with the ends of the ellipse, a swivel connection between the platform and body portion arranged in advance of the axle and in a plane thereabove, and a guiding means for said platform arranged between the platform and body portion in the rear of the axle, substantially as specified.

2. The combination in a vehicle, of a body portion, an oblong platform having the axle connected therewith, a swivel connection between the platform and body portion in advance of the axle, a guiding means carried by the body portion and extending beneath the platform, and a bearing-roller carried by the body portion and operating as a guide for the upper face of said platform.

3. In a vehicle, a platform, spaced springs connected at the ends of said platform, an axle connected for rotation to the opposite sides of said springs, a spreader member between said springs adjacent to said axle, the body portion, and a swivel connection between said platform and body portion in advance of the axle, substantially as specified.

4. The combination in a vehicle, of a body portion, an axle, springs spaced apart and connected by one side to said axle, a swivel member connected movably to said body portion, in advance of the axle, a platform formed of a single bar bent to shape and connected by its ends to said swivel member and connected intermediately to the opposite sides of said springs and with its rear portion curved concentrically of said swivel member, and a guiding means carried by said body portion and slidably engaged by the curved portion of said platform, substantially as specified.

5. In a vehicle, the combination of the axle, the body portion, a swivel-stud mounted for transverse oscillation upon said body portion in advance of the axle, and a socket arranged intermediately of an arc-shaped member, said arc-shaped member being connected with said axle at opposite points and having its socket spaced laterally from said axle and disposed in a plane thereabove.

6. In a vehicle, the axle, the body portion, a swivel-stud mounted for transverse oscillation upon said body portion in advance of the axle and a guide member at the rear of the axle, a socket member for said swivel-stud, a platform between said socket member and said axle formed with a curved portion and connected by its ends with said socket member and movably engaging said guide member, substantially as specified.

7. In a vehicle, the axle, the body portion, a swivel-stud mounted for transverse oscillation upon said body portion in advance of the axle and a guide member at the rear of the axle, a socket member for said swivel-stud, and a platform attached by its ends to said socket member and connected with said axle, and provided with a curved portion movably engaging said guide member, substantially as specified.

8. In a vehicle, the axle having spaced springs, the body portion, a swivel-stud mounted for oscillation upon said body portion in advance of the axle, a socket member for said stud, a platform connecting said socket with said axle, and braces connecting said socket member with said springs, substantially as specified.

9. In a vehicle, the combination of a body portion, a platform, spaced springs connected with said platform, an axle connected with the opposite sides of said springs, a swivel connection between said platform and said body portion in advance of the axle, and a guiding means carried by said body portion and movably engaged by said platform in the rear of the axle, substantially as specified.

In testimony that I claim the foregoing as my own I have hereto affixed my signature in the presence of two witnesses.

JOHN H. FERGUSON.

Witnesses:
O. C. SIPE,
J. B. BRADLEY.